United States Patent
Liu et al.

(10) Patent No.: US 10,282,633 B2
(45) Date of Patent: May 7, 2019

(54) CROSS-ASSET MEDIA ANALYSIS AND PROCESSING

(71) Applicant: Apple Inc., Cupertino, CA (US)

(72) Inventors: Shujie Liu, Cupertino, CA (US); Jiefu Zhai, Cupertino, CA (US); Chris Y. Chung, Sunnyvale, CA (US); Hsi-Jung Wu, San Jose, CA (US); Yunfei Zheng, Cupertino, CA (US); Albert E. Keinath, Sunnyvale, CA (US); Xiaosong Zhou, Campbell, CA (US); Ke Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/298,777

(22) Filed: Oct. 20, 2016

(65) Prior Publication Data

US 2017/0109596 A1    Apr. 20, 2017

Related U.S. Application Data (60) Provisional application No. 62/243,848, filed on Oct. 20, 2015.

(51) Int. Cl.
| | | |
|---|---|---|
| *G06K 9/00* | (2006.01) | |
| *G06K 9/46* | (2006.01) | |
| *G06T 5/00* | (2006.01) | |
| *G06F 16/583* | (2019.01) | |
| *G06K 9/03* | (2006.01) | |
| *G06K 9/62* | (2006.01) | |
| *G11B 27/00* | (2006.01) | |

(52) U.S. Cl.
CPC .......... *G06K 9/46* (2013.01); *G06F 16/5838* (2019.01); *G06K 9/036* (2013.01); *G06K 9/6288* (2013.01); *G06T 5/003* (2013.01)

(58) Field of Classification Search
CPC .................................. G06K 9/00; G06T 5/00
USPC ................... 382/103; 348/169–172; 386/278
See application file for complete search history.

(56) References Cited

U.S. PATENT DOCUMENTS

| | | | | |
|---|---|---|---|---|
| 6,163,389 A | * | 12/2000 | Buhr | H04N 1/00132 358/527 |
| 8,131,132 B2 | * | 3/2012 | Klappert | G06F 17/241 386/248 |
| 8,627,507 B2 | * | 1/2014 | Stasi | G06Q 10/0637 380/201 |
| 9,092,436 B2 | * | 7/2015 | Grant | G06F 17/30056 |

* cited by examiner

*Primary Examiner* — Abolfazl Tabatabai
(74) *Attorney, Agent, or Firm* — Baker & Hostetler LLP (57) ABSTRACT

A method for processing media assets includes, given a first media asset, deriving characteristics from the first media asset, searching for other media assets having characteristics that correlate to the characteristics of the first media asset, when a match is found, deriving content corrections for the first media asset or a matching media asset from the other of the first media asset or the matching media asset, and correcting content of the first media asset or the matching media asset based on the content corrections.

45 Claims, 4 Drawing Sheets

CROSS-ASSET MEDIA ANALYSIS AND PROCESSING

CROSS-REFERENCE TO RELATED APPLICATIONS

This application benefits from priority afforded by U.S. application Ser. No. 62/243,848, filed Oct. 20, 2015 and entitled "Cross-Asset Media Analysis And Processing," the disclosure of which is incorporated herein in its entirety.

BACKGROUND

Many techniques can be used to analyze an image to measure its quality, sharpness, exposure, composition, saliency, significance, and other characteristics. Different techniques may also be used to process an image to enhance its quality and/or add effects. In both cases, existing techniques utilize pixel analysis and processing using pixels in the image.

Media assets such as pictures and video may be captured at different times, from different points of view, in one or more capture transactions with one or more devices. When different media assets are captured, they may correlate with other media assets from the same or other devices based on capture times, fields of view, and common captured objects. The timing, viewing, capture settings, and device differences can lead to different qualities, viewpoints, object detection abilities, and other differences in the captured media assets, which can affect media asset processing, coding, and decoding.

When multiple media assets capture the same or similar views and objects, one or more of the similar media assets may be used to determine image and video content, correct images and video, improve object detection, and improve processing of the media assets by applying content and/or characteristics of one or more of the similar media assets to another media asset. The similar media assets can be used instead of or in addition to the traditional pixel analysis of a single captured image.

The inventors therefore have perceived a need to improve the analysis and processing of media assets by cross-analyzing other media assets.

DETAILED DESCRIPTION

The invention disclosed herein includes techniques to utilize other media assets to analyze or process a photograph. A system and method for processing media assets includes, given a first media asset, deriving characteristics from the first media asset, searching for other media assets having characteristics that correlate to characteristics of the first media asset when a match is found, deriving content corrections for the first media asset or a matching media asset from the other of the first media asset and the matching media asset, and correcting content of the first media asset or the matching media asset based on the content corrections. The cross-asset analysis of similar media assets can allow for improved quality, processing, coding, and decoding of a media asset captured by the same or another capture device.

Figure 1:
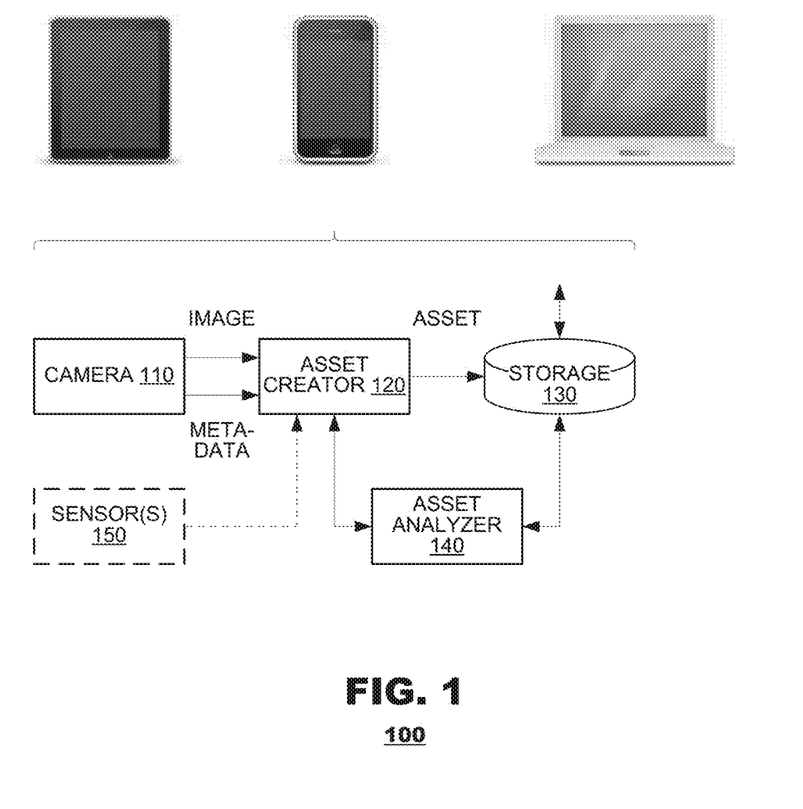
FIG. 1 illustrates an asset management system according to an embodiment of the present invention.

FIG. 1 illustrates an asset management system 100 according to an embodiment of the present invention. The system 100 may include a camera 110, an asset creator 120, asset storage 130 and an asset analyzer 140. The camera 110 may generate image data of a local environment which may include still images and/or a video sequence. The camera 110 also may output metadata representing camera settings and other information associated with capture of the images and/or video. The asset creator 120 may generate asset files from the images/video and metadata, and may store the asset files in asset storage 130. The asset analyzer 140 may analyze assets, provided either by the asset creator 120 or from asset storage 130, to estimate asset characteristics based on their relationships to other assets resident in asset storage 130.

According to an embodiment, the asset analyzer 140 may utilize metadata of other assets (other images, video, or audio assets) available in asset storage 130 to analyze a new image or video sequence. An asset analyzer 140 may analyze metadata stored as part of the asset files to identify asset files having sufficient correlation to the new image to provide an estimate of semantics. The asset storage 130 may store a variety of different types of assets that can be used as a basis for assets. Such assets may include:

Stored video assets, including traditional video (e.g., 24 or 30 fps video), slow motion video and time lapse video;

Stored image assets, including traditional images, burst mode images, and panoramic images; and Stored "live photos," assets that have both still image portions and video portions.

Assets also may have audio data, computer generated graphics data, and the like.

Figure 2:
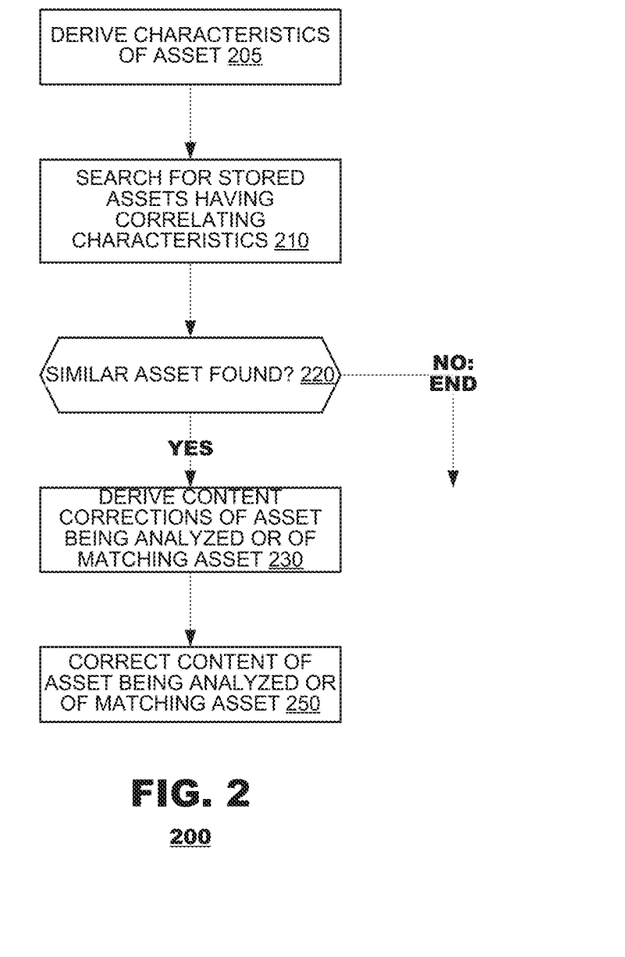
FIG. 2 illustrates an asset analysis method according to an embodiment of the present disclosure.

FIG. 2 illustrates an asset analysis method 200 according to an embodiment of the present disclosure. The method 200 may begin by deriving characteristics of a media asset (box 205). For example, characteristics may include object detection, location detection, fields of view, capture time, and other capture settings. The method 200 may search among asset storage for stored assets that have characteristics correlating to an asset being analyzed (box 210). The method 200 may determine whether a similar asset if found (box 220) and, if so, may attempt to derive content corrections of the asset being analyzed with content of the matching asset, or of the matching asset with content of the asset being analyzed (box 230). The method 200 may apply the content corrections to the asset being analyzed or the matching asset (box 250). Alternatively, analytics of media assets may contribute to other processes, as discussed below.

Correlation among assets may be detected by a variety of techniques. The following use cases are provided as examples:

An asset may be deemed correlated with another asset when the two assets are taken contemporaneously with each other. The two assets can be captured on the same device or on multiple devices.

Asset subcomponents may be deemed to be correlated with each other. This may occur in a live photo asset, where a video sequence and a still image are captured as part of a single capture transaction. This may occur also in a burst photo asset, where a plurality of still images is captured as part of a common capture transaction. The assets can be captured on the same device or on multiple devices.

Assets that are captured in a common location at a common time by the same device may be deemed to be correlated with each other.

Assets that are captured in a common location at a common time but by different devices than an asset being analyzed may be deemed to be correlated with each other.

Assets that are captured in a common location as an asset being analyzed, whether by the same or different devices, may be deemed to be correlated with each other.

Each of these examples describes use cases with different likelihoods of correlation among assets. The correlation can include common or similar characteristics among different media assets. In the live photo asset and burst photo asset examples, asset subcomponents typically are captured as part of a common capture transaction that is completed within a few seconds. Thus, a high degree of correlation is likely among the content of the asset subcomponents. By contrast, assets that are captured at a common location at a common time but by different devices have a lower likelihood correlation among image content. It is possible that different devices will capture asset content (e.g., an object) from a common position with a common field of view but it also is possible that the different assets will have different asset content because they have different fields of view. Thus, the processes to derive content (box 230) may be tailored to fit the use cases in which the present techniques are employed. Use cases that involve lower probabilities of correlation typically will include a search process to determine whether image content from two assets can be derived with each other; in some cases, the derivation process may determine that image content from the assets cannot be derived with each other.

Derivation and application of image corrections also may be performed by a variety of techniques. The following use cases are provided as examples. In one example, by using video taken around the same time on the same device as the image, the method 200 can analyze the amount of camera and subject motion in the video when the image is captured. Based on this information and exposure information associated with the assets (that usually can be found in metadata), the method 200 may estimate an amount of motion blur in the image and may correct for the motion blur. Similarly, the method 200 may estimate and correct other types of blur.

Similarly, in a burst mode asset, the method 200 may use a group of images taken around the same time on the same device to estimate motion blur in an asset. Again, based on motion blur estimates and exposure information associated with the assets (that usually can be found in metadata), the method 200 may estimate an amount of motion blur in the image and may correct for the motion blur. Similarly, the method 200 may estimate and correct other types of blur.

In a live photo asset, a still image typically is captured at a higher spatial resolution than its associated video sequence. For example, a still image may be captured at 12 megapixels where video may be captured at a 720p resolution. Following content derivation, the method 200 may perform spatial upsampling of the video sequence, using content from the higher resolution still image as a basis to import details into the upsampled video. Similarly, video content captured at a higher resolution than a captured image may be used to import details into the image.

In an image asset, the method may improve operation of face detection/recognition processes. If facial recognition fails to detect a face in an image, for example, because the angle of the face, or an occlusion of the face interferes with recognition, facial recognition processes from an associated video asset may be applied to the image. Video-based facial recognition processes employ face tracking techniques that permit tracking of image content associated with facial features even if recognition is interrupted. By mapping the face information of video frames or other image assets captured at surrounding the image, the face detection/recognition of image can be improved. Face detection/recognition could also be improved by using audio assets. For example, captured voice data could be used to identify a person and improve facial recognition of the person in video or photo assets.

In a panoramic image asset, the method 200 may correct portions of a panoramic image. Panoramic images typically are composite images that are stitched together from a plurality of captured images but stitching processes can lead to errors. By deriving content of normal images (single capture images) on a panoramic image, then identifying discrepancies, the method 200 may identify areas of a panoramic image that have stitching errors. The method 200 may correct the image content of the panoramic image using content of the normal image. Alternatively, if content derivation indicates the panoramic image has a low level of error, the method 200 may designate a region of the panoramic image where the normal image was derived as an area of emphasis and may apply image effects to the area of derivation to highlight the content.

In a burst mode asset, the method 200 may compare images in the burst mode group to each other and identify images of high quality and images of low quality. The method 200 may select a high quality image from the burst mode group as an image to be used in a media summary. The method 200 may correct images with relatively bad quality using content of the high quality images. Alternatively, the method 200 may cause the images with bad quality to be discarded or to be compressed at a high level in order to conserve storage resources of an asset store. Such techniques also may be applied to image assets that are not taken as burst mode assets, such as a group of photos that are linked together temporally and/or by location.

Alternatively, in a burst mode asset, the method 200 may compare images in the burst mode group to each other to extract background content from the burst mode set. The method 200 may create a background composite image therefrom, then alter the images in the burst mode set to place foreground image content from the images over the composite background. This may create a moving slide show effect in the set of burst mode images. Similarly, a composite image may be created using extracted foreground content, and background image content from other images may be placed over the composite foreground image.

When the method 200 operates on images taken from different devices at a common location, the method 200 may attempt to create a spatial model of the locations and orientations of different capture devices that created the assets. Assets may be stored on a common device as shown in FIG. 1 or, alternatively, may be stored at a network location such as by a server on the Internet. Using the model of the locations of image capture, the method 200 may estimate which assets have similar fields of view as each other. The method 200 may combine content from different assets to create three-dimensional models of objects in images to create a multi-view effect.

When the method 200 operates on images taken from common locations but at different times (for example, landscape images or images of landmarks), the method 200 may identify assets that are designated as having high image quality. Such images, for example, may be resident on image servers on networks such as the Internet; they may be production copies of the landmarks, landscapes and the like. The method 200 may attempt to derive content of a first asset (for example, an amateur-taken image of the landmark) with content of the high quality asset and may utilize content of the high quality asset in image correction techniques, for example, to alter coloration, brightness, noise content and other parameters of the image.

In another embodiment, assets need not be corrected but, instead, detected correlation among assets may be used to process assets in alternate ways. For example, video and image assets taken around the same time on different devices can be analyzed to provide more semantic info about the image, and for quality comparison and evaluation. Such semantic information may include assigning a quality level to an asset. Analysis may include providing correlation to face detection and recognition processes to improve performance of those processes.

In another embodiment, the detection, classification, and recognition of objects, faces, scene types, and activities captured in media assets can be used to improve detection, classification, and recognition in other media assets. For example, a media asset capturing a sporting event may be used to classify another media asset with the same or similar content as also being associated with a sporting event, and to identify objects such as a stadium, arena, or person associated with the captured activity. Content corrections could therefore include classifying a scene of a photo or video captured in the same or similar location.

In a further embodiment, audio assets taken around the same time of the image can be analyzed to detect excitement/speech/background to help retrieve semantics of the image and estimate its "interestingness" for media summary purposes.

The principles of the present disclosure find application with asset analyzers that operate both contemporaneously with asset capture/creation and asynchronously with asset capture/creation. For example, asset analysis may be performed as an asset is generates while it remains "live" in an asset capture application. Thus, the asset analyzer may engage immediately following capture of an image or video by an operator and may apply corrections to the image/video on a draft basis, pending confirmation from an operator that the corrections are to be applied. Alternatively, the asset analysis may be performed on an asset that was generated and stored within a device at some prior point in operation. For example, an operator may recall a previously-created asset from storage and engage the asset analyzer. The asset analyzer may apply corrections to the recalled asset at that point.

Moreover, although FIG. 1 illustrates the asset analyzer 140 as part of a common computing platform as, for example, the camera 110, the principles of the present disclosure find application with asset analyzers in other configurations. In another embodiment, the asset analyzer 140 may be provided on a computing platform that is separate from the device on which asset content was captured. The asset analyzer 140, for example, may reside on a different computer platform (perhaps a server) than the camera. It may recall assets from asset storage 130, which again may but need not be on the same computing platform as the camera 110 or the asset analyzer 140, and process them as discussed herein.

Figure 3:
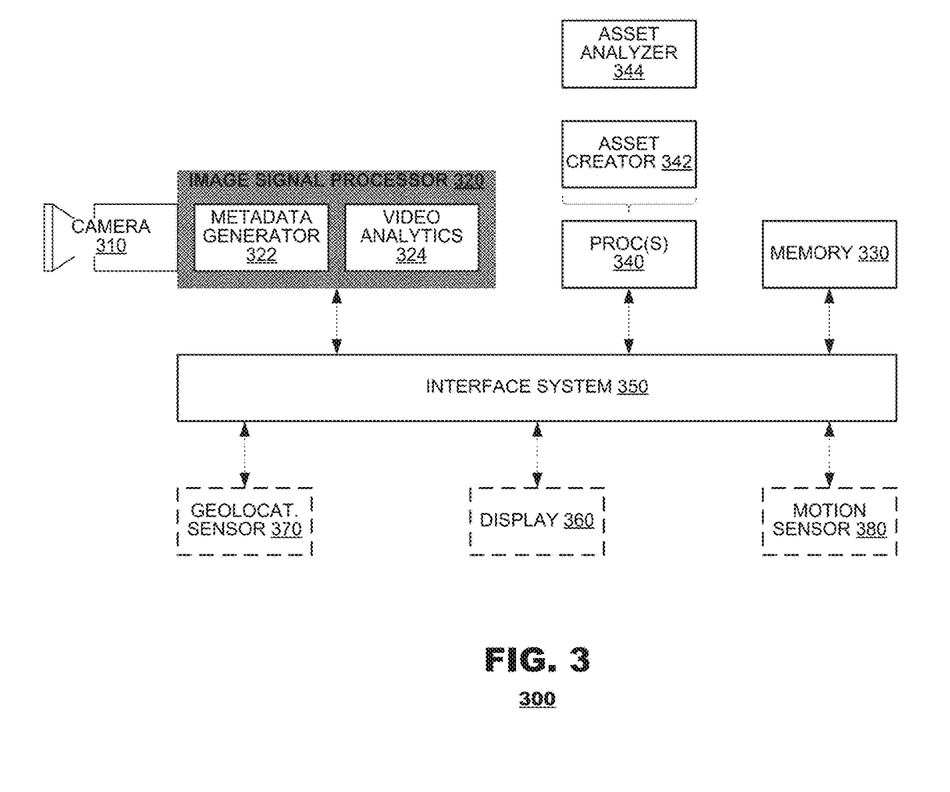
FIG. 3 illustrates a system 300 that may perform the operations listed above in FIG. 2 according to an embodiment of the present disclosure.

FIG. 3 illustrates a system 300 that may perform the operations listed above in FIG. 2 according to an embodiment of the present disclosure. The system 300 may process an asset and apply corrections thereto based on correlation with other assets. The system 300 may include a camera 310, an image signal processor 320, a memory 330, one or more processor(s) 340, and a communication interface 350.

The camera 310 may include one or more image sensors. The image sensor(s) may include charge-coupled device (CCD) or complementary metal-oxide semiconductor (CMOS) imagers that receive light from the environment projected through one or more lens, and convert the light to a digital image. The image sensor(s) may capture still images or video. In some embodiments, an image sensor may be located on the back of a device housing opposite a side of the housing that contains a display 360 (optional), so that the display may be used as a viewfinder for still and/or video image acquisition. In some embodiments, another image sensor may be located on the front of the device housing so that the user's image may be obtained for videoconferencing while the user views the other video conference participants on the display 360.

The image signal processor 320 may include a metadata generator 322 and a video analytics unit 324. The metadata generator 322 may supplement image data obtained by the camera with metadata that describe circumstances of image capture. For example, the metadata may include data describing operation of the camera (exposure settings, aperture settings, and the like). The video analytics unit 324 may generate other metadata from an analysis of image data from the camera including, for example, estimates of noise in the image data, motion blur in the image data and other characteristics of video that are obtained from analysis of image content. If provided, the metadata generator 322 may include such analytic information in its metadata output. Moreover, the metadata generator 322 may include other metadata elements that may be provided by other system components (for example, geolocation sensors 370, motion sensors 380, and the like).

In some embodiments, the image signal processor 320 may perform pre-processing adjustments to a captured raw image such as adjustments for white balance or adjustments for lens distortions, for example. The adjustments may be implemented via application specific integrated circuits (ASIC) or software, or a combination thereof. The adjustments may be stored as metadata.

In embodiments, the various components shown in FIG. 3 may be implemented in hardware, software, or a combination of hardware and software, including one or more signal processing and/or ASIC. In some embodiments, image signal processor 320 may be implemented as a single programmable ASIC. In other embodiments, multiple separate integrated circuits can be used.

The processor 340 may execute various applications, including applications representing the asset creator 342 and the asset analyzer 344, to create, analyze, and store media assets. The asset creator 342 may create asset files from the image/video data and associated metadata output by the image signal processor 320 and may store the asset files in memory 330. Applications such as movie creators, cameras, avatar generators, photo editors, and animation generators may be used to create media assets using a variety of techniques, such as those discussed in FIG. 2. The processor

340 may be represented by a central processing unit (CPU) or graphics processing unit (GPU) of a computer system.

The asset analyzer 344 may analyze and correct assets as discussed in FIG. 2. For example, the asset analyzer 344 may derive characteristics from the media assets. Deriving characteristics can include detecting objects, determining locations, estimating capture time, estimating exposure settings, identifying spatial resolution, and identifying foreground and background content.

The asset analyzer 344 may also search for other media assets having characteristics that correlate to characteristics of another media asset. Searching for correlating media assets may include searching for media assets with matching objects detected, assets captured at the same or a similar location, assets having the same or similar fields of view, assets captured at a common location and time, assets having the same exposure settings, assets having similar foreground and/or background content, and related assets of a different type (e.g., an image related to a video sequence).

The asset analyzer 344 may derive content corrections and correct media assets based on matching media assets found in searches. The media asset corrections may include combining media assets, applying data from one or more matching media assets to another media asset, adjusting motion blur based on exposure settings of a matching asset, upsampling a lower resolution asset using higher resolution content of a matching asset, applying panoramic image content of a matching asset to another asset, replacing data of one asset with data of another asset, and creating composite background images by combining background data of matching assets.

The memory 330 may store asset files and program instructions representing the asset creator 342, the asset analyzer 344 and an operating system (not shown) of the device. The program instructions may be furnished to the processor 340 for execution. The media assets may be furnished to the processor 340 as requested by the application(s).

The system 300 may include components in addition to those illustrated. For example, as discussed above, the system 300 may include one or more displays 360, geolocation sensors 370 and motion sensors 380. The display 360 may include a display pipeline (not shown) that performs a sequence of steps to create a representation of assets for display. A display may provide an input interface and an output interface between the system 300 and a user. The display may display visual output such as the representation of the asset and other application output to the user. The visual output may include graphics, text, icons, video, and any combination thereof (collectively termed "graphics"). The visual output may include various user-selectable interface elements associated with the analysis tools described herein, in embodiments.

Figure 4:
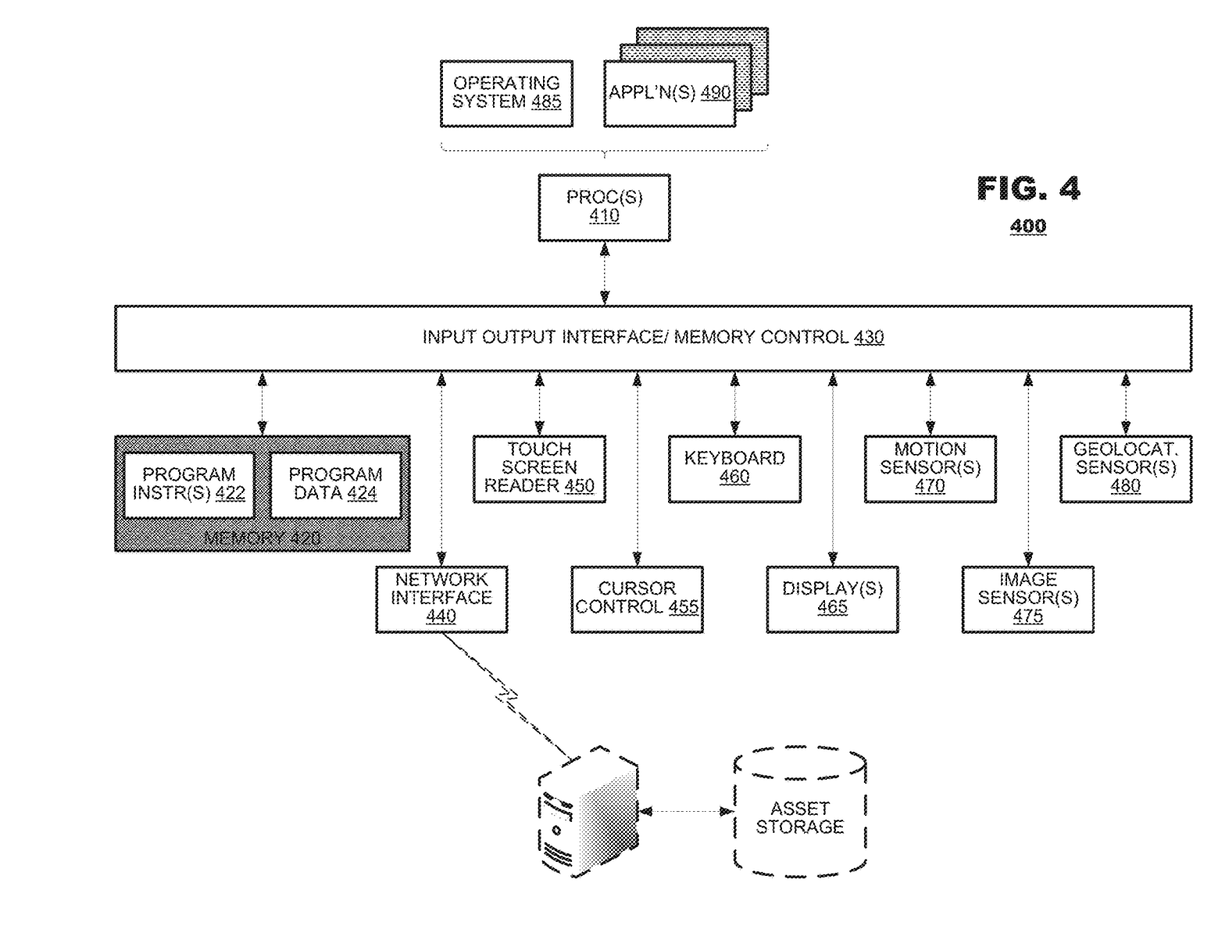
FIG. 4 illustrates computer system according to another embodiment of the present disclosure.

FIG. 4 illustrates computer system 400 according to another embodiment of the present disclosure. In different embodiments, the computer system 400 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In the illustrated embodiment, computer system 400 may include one or more processors 410 coupled to a system memory 420 via an input/output (I/O) interface 430. Computer system 400 further may include a network interface 440 coupled to I/O interface 430, and one or more input/output devices, such as a touch screen reader 450, cursor control device 455, keyboard 460, display(s) 465, motion sensor(s) 470, image sensor(s) 475 and geolocation sensors 480. The types of such input/output devices may vary based on the types of computer systems involved. Further, some types of input/output devices may be omitted from a computer system 400, again, based on its type. For example, a tablet computer may include a touch screen reader 450 but omit a keyboard 460 whereas a desktop computer may omit the touch screen reader 450 but include the keyboard 460. Still other types of devices, for example, a notebook computer, may include both a touch screen reader 450 and a keyboard. For the purposes of the present discussion, such implementation variations are immaterial to the present disclosure unless otherwise noted herein.

In some cases, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 400 that are distinct from those nodes implementing other elements.

In various embodiments, computer system 400 may be a uniprocessor system including one processor 410, or a multiprocessor system including several processors 410 (e.g. two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x85, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 424 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions 422 may be configured to implement video analysis or video editing application incorporating any of the functionality described above. Additionally, data storage 424 of memory 420 may include video content and video metadata, including any of the information or data structures described above, including but not limited to video images or frames and corresponding metadata used in implementing the techniques described herein. In some embodiments, program instructions and/or data may be received, sent or stored upon different types of computer-accessible media or on similar media separate from system memory 420 or computer system 400. While computer system 400 is described as implementing the functionality of functional blocks of previous Figures, any of the functionality described herein may be implemented via such a computer system.

In one embodiment, the I/O interface 430 may coordinate I/O traffic between processor 410, system memory 420, and any peripheral devices in the device, including network interface 440 or other peripheral interfaces, such as input/output devices 450-480. In some embodiments, I/O interface 430 may perform any necessary protocol, timing or other data transformations to convert data signals from one component (e.g. system memory 420) into a format suitable for use by another component (e.g. processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may exchange data between computer system 400 and other devices attached to a network (e.g. carrier or agent devices) or between nodes of computer system 400. The network may in various embodiments include one or more networks including but not limited to Local Area Networks (LANs) (e.g. an Ethernet or corporate network), Wide Area Networks (WANs) (e.g. the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450-480 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

As shown in FIG. 4, memory 420 may include program instructions 422, which may be processor-executable to implement any element or action described above. In one embodiment, the program instructions 422 and data 424 may define an operating system 485 and one or more application programs 490 when they are executed by the processor(s) 410. Note that data 424 may include any data or information described above.

Moreover, as shown in FIG. 4, the system 400 may communicate with other computer systems that store other assets, for example, in a networked computer environment such as the Internet. Thus, the system 400 may exchange data with other systems via the network interface 440 to exchange asset metadata and/or asset content data as the system 400 performs the operations discussed above in connection with FIG. 2. In other embodiments, the system 400 may transmit asset metadata and/or asset content data to other computer systems, which may perform the operations discussed above and provide results back to the system 400.

The block diagram shown in FIG. 4 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g. as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g. disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The invention claimed is:

1. A method for processing media assets, comprising:
given a first media asset, deriving characteristics from the first media asset;
searching for other media assets having characteristics that correlate to the characteristics of the first media asset;
when a matching media asset is found, deriving content corrections for one of the group of the first media asset and a matching media asset from the other of the first media asset and the matching media asset; and
correcting content of the first media asset or the matching media asset based on the content corrections.

2. The method of claim 1, wherein:
the deriving content corrections comprises deriving content corrections for the first media asset from the matching media asset, and
the correcting content comprises correcting content of the first media asset.

3. The method of claim 1, wherein:
the deriving content corrections comprises deriving content corrections for the matching media asset from the first media asset, and the correcting content comprises correcting content of the matching media asset.

4. The method of claim 1, wherein:
the deriving characteristics comprises detecting an object from content of the first media asset or the matching media asset, and
the searching comprises searching for other media assets in which the detected object is represented.

5. The method of claim 1, wherein
the deriving characteristics comprises determining a location where the first media asset or
the matching media asset was captured, and the searching comprises searching for other media assets captured at the location.

6. The method of claim 5, wherein:
the searching further comprises searching for other media assets having similar fields of view of the location, and
the deriving content corrections comprises combining at least one of the first media asset and the matching media asset with the other media assets to create a multi-dimensional model.

7. The method of claim 1, wherein:
the first media asset and the matching media asset are captured by different devices,
the deriving characteristics comprises estimating a capture time and a location of the first media asset or the matching media asset, and
the searching comprises searching for other media assets captured at the location at a matching capture time.

8. The method of claim 1, wherein:
the first media asset and the matching media asset are captured by a common device at different times,
the deriving characteristics comprises estimating exposure settings of the first media asset or the matching media asset, and
the searching comprises searching for other media assets with matching exposure settings.

9. The method of claim 1, wherein:
the first media asset and the matching media asset are captured with different capture settings by a common device; and
the correcting content comprises altering the capture settings of the first media asset or the matching media asset based on the capture settings of the other of the first media asset and the matching media asset.

10. The method of claim 1, wherein:
the first media asset is an image or a video sequence and the matching media asset is the other of an image or a video sequence,
the deriving characteristics comprises detecting an object in one of the first media asset or the matching media asset, and
the correcting content comprises applying data associated with the object to the other of the first media asset or the matching media asset.

11. The method of claim 1, wherein:
the first media asset is an image or a video sequence and the matching media asset is the other of an image or a video sequence,
the deriving characteristics comprises identifying exposure settings associated with the first media asset or the matching media asset, and
the correcting content comprises adjusting blur in the first media asset or the matching media asset based on the identified exposure settings.

12. The method of claim 1, wherein:
the first media asset is an image or a video sequence and the matching media asset is the other of an image or a video sequence,
the deriving characteristics comprises identifying a spatial resolution associated with the first media asset or the matching media asset and a higher spatial resolution associated with the other of the first media asset and the matching media asset, and
the correcting content comprises upsampling content of the first media asset or the matching media asset using higher spatial resolution content of the other of the first media asset and the matching media asset.

13. The method of claim 1, wherein the correcting content comprises applying panoramic image content of the first media asset or the matching media asset to the other of the first media asset and the matching media asset.

14. The method of claim 1, wherein the correcting content comprises replacing image data of the first media asset or the matching media asset with higher quality image data from the other of the first media asset and the matching media asset.

15. The method of claim 1, wherein:
the deriving characteristics comprises identifying foreground image content and background image content within the first media asset,
the searching comprises searching for other media assets with similar content,
when the similar content is background image content, the correcting content comprises creating a composite background image using the similar background content and the background image content, and placing the foreground image content over the composite background image, and
when the similar content is foreground image content, the correcting content comprises creating a composite foreground image using the similar foreground content and foreground image content, and placing the background image content over the composite foreground image.

16. The method of claim 1, wherein the searching comprises searching for an audio asset related to the first media asset or the matching media asset, and wherein the method further comprises indicating a significance of the first media asset or the matching media asset based the audio asset.

17. The method of claim 1, wherein the deriving characteristics comprises estimating a noise content in image data.

18. The method of claim 1, wherein the deriving characteristics comprises estimating a motion blur in image data.

19. The method of claim 18, wherein the correcting content comprises correcting the motion blur.

20. The method of claim 1, wherein the deriving characteristics comprises detecting an object in image data.

21. The method of claim 1, wherein the deriving characteristics comprises detecting a face.

22. The method of claim 1, wherein the content corrections include correcting coloration.

23. The method of claim 1, wherein the content corrections include correcting brightness.

24. The method of claim 1, wherein the content corrections include correcting noise content.

25. The method of claim 1, wherein the content corrections include correcting scene classification.

26. A system for processing media assets, comprising:
an image signal processor to capture; and
a processor to:
create and store media assets;
given a first media asset, derive characteristics from the first media asset;

search for other media assets that correlate to the characteristics of the first media asset;

when a matching media asset is found, deriving content corrections for one of the group of the first media asset and a matching media asset from the other of the first media asset and the matching media asset; and correct content of the first media asset or the matching media asset based on the content corrections.

27. The system of claim 26, further comprising a camera to capture the first media asset and the correlating media asset.

28. The system of claim 26, further comprising a first camera to capture the first media asset and a second camera to capture the correlating media asset.

29. The system of claim 26, wherein the image signal processor generates metadata to supplement the first media asset the metadata comprising at least one of the following: image capture characteristics, an analysis of the first media asset, and data provided by other components of the system.

30. A non-transitory computer readable medium storing instructions thereon that, when executed by a computer, cause it to perform a method of:

given a first media asset, deriving characteristics from the first media asset;

searching for other media assets having characteristics that correlate to the characteristics of the first media asset;

when a matching media asset is found, deriving content corrections for one of the group of the first media asset and a matching media asset from the other of the first media asset and the matching media asset; and correcting content of the first media asset or the matching media asset based on the content corrections.

31. The non-transitory computer readable medium of claim 30, wherein:

the deriving content corrections comprises deriving content corrections for the first media asset from the matching media asset, and the correcting content comprises correcting content of the first media asset.

32. The non-transitory computer readable medium of claim 30, wherein:

the deriving content corrections comprises deriving content corrections for the matching media asset from the first media asset, and the correcting content comprises correcting content of the matching media asset.

33. The non-transitory computer readable medium of claim 30, wherein:

the deriving characteristics comprises detecting an object from content of the first media asset or the matching media asset, and the searching comprises searching for other media assets in which the detected object is represented.

34. The non-transitory computer readable medium of claim 30, wherein:

the deriving characteristics comprises determining a location where the first media asset or the matching media asset was captured, and the searching comprises searching for other media assets captured at the location.

35. The non-transitory computer readable medium of claim 34, wherein:

the searching further comprises searching for other media assets having similar fields of view of the location, and the deriving content corrections comprises combining at least one of the first media asset or the matching media asset with the other media assets to create a multi-dimensional model.

36. The non-transitory computer readable medium of claim 30, wherein:

the first media asset and the matching media asset are captured by different devices, the deriving characteristics comprises estimating a capture time and a location of the first media asset or the matching media asset, and the searching comprises searching for other media assets with a matching capture time and a matching location.

37. The non-transitory computer readable medium of claim 30, wherein:

the first media asset and the correlating media asset are captured by a common device at different times, the deriving characteristics comprises estimating exposure settings of the first media asset or the matching media asset, and the searching comprises searching for other media assets with matching exposure settings.

38. The non-transitory computer readable medium of claim 30, wherein:

the first media asset and the matching media asset are captured with different capture settings by a common device; and the correcting content comprises altering the capture settings of the first media asset or the matching media asset based on the capture settings of the other of the first media asset and the matching media asset.

39. The non-transitory computer readable medium of claim 30, wherein:

the first media asset is an image or a video sequence and the matching media asset is the other of an image or a video sequence, the deriving characteristics comprises identifying an object in one of the first media asset or the matching media asset, and the correcting content comprises applying data associated with the object to the other of the first media asset or the matching media asset.

40. The non-transitory computer readable medium of claim 30, wherein:

the first media asset is an image or a video sequence and the correlating media asset is the other of an image or a video sequence, the deriving characteristics comprises identifying exposure settings associated with the first media asset or the matching media asset, and the correcting content comprises adjusting blur in the first media asset or the matching media asset based on the identified exposure settings.

41. The non-transitory computer readable medium of claim 30, wherein:

the first media asset is an image or a video sequence and the matching media asset is the other of an image or a video sequence, the deriving characteristics comprises identifying a spatial resolution associated with the first media asset or the matching media asset and a higher spatial resolution associated with the other of the first media asset or matching media asset, and the correcting content comprises upsampling content of the first media asset or the matching media asset using higher spatial resolution content of the other of the first media asset or the matching media asset.

42. The non-transitory computer readable medium of claim 30, wherein the correcting content comprises applying panoramic image content of the first media asset or the matching media asset.

43. The non-transitory computer readable medium of claim 30, wherein the correcting content comprises replacing image data from the first media asset or the matching media asset with higher quality image data from the other of the first media asset or the matching media asset.

44. The non-transitory computer readable medium of claim 30, wherein:
- the deriving characteristics comprises identifying foreground image content and background image content within the first media asset,
- the searching comprises searching for other media assets with similar background content,
- when the similar content is background image content, the correcting content comprises creating a composite background image using the similar background content and the background image content, and placing the foreground image content over the composite background image, and
- when the similar content is foreground image content, the correcting content comprises creating a composite foreground image using the similar foreground content and foreground image content, and placing the background image content over the composite foreground image.

45. The non-transitory computer readable medium of claim 30, wherein the searching comprises searching for an audio asset related to the first media asset or the matching media asset, and wherein the method further comprises indicating a significance of the first media asset or the matching media asset based on the audio asset.

* * * * *